United States Patent
Lu et al.

(10) Patent No.: US 11,800,053 B2
(45) Date of Patent: Oct. 24, 2023

(54) METHOD, DEVICE AND COMPUTER READABLE STORAGE MEDIUM FOR VIDEO FRAME INTERPOLATION

(71) Applicant: BOE TECHNOLOGY GROUP CO., LTD., Beijing (CN)

(72) Inventors: Yunhua Lu, Beijing (CN); Ran Duan, Beijing (CN); Guannan Chen, Beijing (CN); Lijie Zhang, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 442 days.

(21) Appl. No.: 17/278,403

(22) PCT Filed: May 29, 2020

(86) PCT No.: PCT/CN2020/093530
§ 371 (c)(1),
(2) Date: Mar. 22, 2021

(87) PCT Pub. No.: WO2021/237743
PCT Pub. Date: Dec. 2, 2021

(65) Prior Publication Data
US 2022/0201242 A1    Jun. 23, 2022

(51) Int. Cl.
H04N 7/01 (2006.01)
G06T 7/50 (2017.01)
(Continued)

(52) U.S. Cl.
CPC ............. *H04N 7/0137* (2013.01); *G06T 3/40* (2013.01); *G06T 7/246* (2017.01); *G06T 7/269* (2017.01);
(Continued)

(58) Field of Classification Search
CPC ......... H04N 13/243; H04N 2013/0081; H04N 13/128; H04N 13/232; H04N 13/271; H04N 13/383; H04N 23/957; H04N 13/302
See application file for complete search history.

(56) References Cited

U.S. PATENT DOCUMENTS

| | | |
|---|---|---|
| 10,776,688 B2 | 9/2020 | Jiang et al. |
| 2010/0129048 A1* | 5/2010 | Pitts .................... H04N 13/207 348/E7.003 |

(Continued)

FOREIGN PATENT DOCUMENTS

| | | |
|---|---|---|
| CN | 109145922 A | 1/2019 |
| CN | 109151474 A | 1/2019 |

(Continued)

OTHER PUBLICATIONS

Written Opinion of International Application No. PCT/CN2020/093530 dated Feb. 25, 2021.
(Continued)

*Primary Examiner* — Samira Monshi
(74) *Attorney, Agent, or Firm* — Perilla Knox & Hildebrandt LLP; Kenneth A. Knox (57) ABSTRACT

The present disclosure relates to the field of information display, and specifically to a method, device, computer readable storage medium, and electronic device for video frame interpolation. The method comprises: obtaining, based on two input frames, two initial optical flow maps corresponding to the two input frames; optimizing the initial optical flow maps to obtain target optical flow maps; obtaining an interpolation frame kernel, two depth maps and two context feature maps based on the two input frames; obtaining an output frame using a frame synthesis method based on the target optical flow maps, the depth maps, the context feature maps, and the interpolation frame kernel.

20 Claims, 4 Drawing Sheets

(51) Int. Cl.
*G06T 7/246* (2017.01)
*G06T 7/269* (2017.01)
*G06T 3/40* (2006.01)

(52) U.S. Cl.
CPC ...... *G06T 7/50* (2017.01); *G06T 2207/10016* (2013.01); *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 2017/0278289 A1* | 9/2017 | Marino | G06T 7/536 |
| 2017/0353670 A1* | 12/2017 | Zimmer | H04N 5/272 |
| 2019/0138889 A1 | 5/2019 | Jiang et al. | |
| 2020/0394752 A1 | 12/2020 | Liu et al. | |

FOREIGN PATENT DOCUMENTS

| | | |
|---|---|---|
| CN | 110351511 A | 10/2019 |
| CN | 110392282 A | 10/2019 |
| CN | 110738697 A | 1/2020 |
| WO | 2019168765 A1 | 9/2019 |

OTHER PUBLICATIONS

Bao, Wenbo et al. "Depth-Aware Video Frame Interpolation." 2019 IEEE/CVF Conference on Computer Vision and Pattern Recognition (CVPR) (Apr. 2019): 3698-3707.

* cited by examiner

METHOD, DEVICE AND COMPUTER READABLE STORAGE MEDIUM FOR VIDEO FRAME INTERPOLATION

CROSS-REFERENCE TO RELATED APPLICATION

The present application is a 35 U.S.C. 371 national phase application of International Patent Application No. PCT/CN2020/093530 filed on May 29, 2020, the entire disclosure of which is incorporated by reference herein.

TECHNICAL FIELD

The present disclosure relates to the field of information display technology and, specifically, to a method, device, computer readable storage medium, and electronic device for video frame interpolation.

BACKGROUND

Video frame interpolation is a research area in the field of digital image processing and computer vision where the frame rate of video can be improved using video frame interpolation. The existing video frame interpolation method consists of several sub-modules in parallel, where the accuracy rate of each module is low, resulting that the final interpolation result will be affected by the accuracy rate of each module and the final synthesis module, and that the obtained image containing an interpolation frame has low accuracy.

SUMMARY

According to an aspect of the present disclosure, there is provided a video frame interpolation method, comprising:
  obtaining two input frames and obtaining, based on the two input frames, two initial optical flow maps corresponding to the two input frames;
  performing an up-sampling process on the two initial optical flow maps to obtain two target optical flow maps;
  obtaining an interpolation frame kernel, two depth maps each corresponding to a respective one of the two input frames, and two context feature maps each corresponding to a respective one of the two input frames, based on the two input frames; and
  obtaining an output frame using a frame synthesis method based on the two target optical flow maps, the two depth maps, the two context feature maps, and the interpolation frame kernel,
  wherein at least one of the following conditions applies:
    an iterative residual optical flow estimation process is performed on the two input frames to obtain the two initial optical flow maps;
    the two initial optical flow maps are processed using a pixel adaptive convolution joint up-sampling process based on the two input frames to obtain the two target optical flow maps;
    the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;
    the output frame is obtained using a pixel adaptive convolution frame synthesis method based on the two target optical flow maps, the two depth maps, the two context feature maps, and the interpolation frame kernel; and an interpolation frame for the two input frames is obtained based on the output frame,
  wherein the two input frames are image frames at two different time moments in a multi-frame video image.

In an exemplary embodiment of the present disclosure, the iterative residual optical flow estimation process performed on the two input frames to obtain the two initial optical flow maps, comprises:
  performing the optical flow estimation process for a plurality of times on the two input frames, wherein while performing the optical flow estimation process for the plurality of times, input and output of the (N+1)th optical flow estimation process are upated using a final output of the Nth optical flow estimation process, N being a positive integer greater than or equal to 1; and
  using the final output of the last optical flow estimation process as the two initial optical flow maps.

In an exemplary embodiment of the present disclosure, the updating of the input and the output of the (N+1)th optical flow estimation process using the final output of the Nth optical flow estimation process, comprises:
  obtaining two inputs of the (N+1)th optical flow estimation process by summing up the two final outputs of the Nth optical flow estimation process and the two input frames of the first optical flow estimation respectively; and
  obtaining the final output of the (N+1)th optical flow estimation process by summing up the two final outputs of the Nth optical flow estimation process and the two initial outputs of the (N+1)th optical flow estimation process respectively.

In an exemplary embodiment of the present disclosure, the two input frames comprises a first input frame and a second input frame, the two initial optical flow maps comprises a first initial optical flow map and a second initial optical flow map, the two target optical flow maps comprises a first target optical flow map and a second target optical flow map, the first input frame corresponds to the first initial optical flow map, and the second input frame correspond to the second initial optical flow map, wherein the processing the two initial optical flow maps using a pixel adaptive convolution joint up-sampling process based on the two input frames to obtain the target optical flow maps, comprises:
  by using the first input frame as a guide map for the pixel adaptive convolution joint up-sampling process, performing the pixel adaptive convolution joint up-sampling process on the first initial optical flow map to obtain the first target optical flow map; and
  by using the second input frame as a guide map for the pixel adaptive convolution joint up-sampling process, performing the pixel adaptive convolution joint up-sampling process on the second initial optical flow map to obtain the second target optical flow map.

In one exemplary embodiment of the present disclosure, the video frame interpolation method comprises:
  performing a feature extraction process on the first initial optical flow map and the second initial optical flow map respectively to obtain a first reference optical flow map and a second reference optical flow map, and performing a feature extraction process on the first input frame and the second input frame respectively to obtain a first reference input map and a second reference input map;

performing a joint up-sampling process at least once on the first reference optical flow map using the first reference input map as a guide map and performing a feature extraction process to obtain the first target optical flow map; and performing a joint up-sampling process at least once on the second reference optical flow map using the second reference input map as a guide map, and performing a feature extraction process to obtain the second target optical flow map.

In an exemplary embodiment of the present disclosure, the training of the initial depth estimation model using the error loss between the reference virtual surface normal generated by the real depth-of-field map of the two input frames and the target virtual surface normal generated by the target depth-of-field map to obtain the target depth estimation model, includes:

obtaining the real depth-of-field map of the two input frames and calculating the reference virtual surface normal of the real depth-of-field map;

obtaining the target depth-of-field map using the initial depth estimation model based on the two input frames and calculating the target virtual surface normal of the target depth-of-field map; and updating parameters of the initial depth estimation model based on the error loss between the reference virtual surface normal and the target virtual surface normal to obtain the target depth estimation model.

In an exemplary embodiment of the present disclosure, the obtaining of the output frame using a pixel adaptive convolution frame synthesis method based on the target optical flow maps, the depth maps, the context feature maps, and the interpolation frame kernel, comprises:

determining two projected optical flow maps based on the two target optical flow maps and the two depth maps, and obtaining an interpolation frame kernel, two deformed depth maps, two deformed input frames, and two deformed context feature maps; and using the pixel adaptive convolution synthesis method to synthesize the two projected optical flow maps, the interpolation frame kernel, the two deformed depth maps, the two deformed input frames, and the two deformed context feature maps, so as to obtain the output frame.

In an exemplary embodiment of the present disclosure, the using the pixel adaptive convolution synthesis method to synthesize the two projected optical flow maps, the interpolation frame kernel, the two deformed depth maps, the two deformed input frames, and the two deformed context feature maps so as to obtain the output frame, comprises:

stitching the two projected optical flow maps, the two deformed depth maps, the two deformed input frames, the interpolation frame kernel and the two deformed context feature maps to obtain a synthesized image; and performing a frame synthesis process containing a pixel adaptive convolution on the synthesized image to obtain the output frame.

In an exemplary embodiment of the present disclosure, the frame synthesis process containing the pixel adaptive convolution performed on the synthesized input image to obtain the output frame comprises:

inputting the synthesized image into a first residual module; and using an output feature map of the first residual module as an input and an input guide map of a second residual module, so as to complete frame synthesis to obtain the output frame, wherein the second residual module comprises at least one residual sub-module, and the at least one residual sub-module comprises a pixel adaptive convolution layer.

In an exemplary embodiment of the present disclosure, the determination of the projected optical flow maps based on the two target optical flow maps and the two depth maps, and the obtaining of the interpolation frame kernel, the two deformed depth maps, the two deformed input frames, and the two deformed context feature maps, comprise:

performing a depth-aware optical flow projection process on the two target optical flow maps respectively according to the two depth maps so as to obtain the projected optical flow maps;

performing a spatio-temporal context feature extraction process on the two input frames so as to obtain the two context feature maps, and performing an interpolation frame kernel estimation process on the two input frames so as to obtain the interpolation frame kernel; and performing an adaptive deformation process on the two input frames, the two depth maps, and the two context feature maps based on the projected optical flow map and the interpolation frame kernel, so as to obtain the two deformed depth maps, the two deformed input frames, and the two deformed context feature maps.

In an exemplary embodiment of the present disclosure, the obtaining of the interpolation frame for the two input frames based on the output frame, comprises:

obtaining an average deformed frame of the two deformed input frames and updating the output frame with the average deformed frame; and using the updated output frame as the interpolation frame.

In an exemplary embodiment of the present disclosure, the updating of the output frame with the average deformed frame, comprises:

summing up the average deformed frame and the output frame to obtain the interpolation frame.

According to an aspect of the present disclosure, there is provided a video frame interpolation device, comprising:

a motion estimation processor for obtaining two input frames and obtaining, based on the two input frames, two initial optical flow maps corresponding to the two input frames;

a data optimization processor for performing an up-sampling process on the two initial optical flow maps to obtain two target optical flow maps;

a depth estimation processor for obtaining an interpolation frame kernel, two depth maps each corresponding to a respective one of the two input frames, and two context feature maps each corresponding to a respective one of the two input frames, based on the two input frames;

an image synthesis processor for obtaining an output frame using a frame synthesis method based on the two target optical flow maps, the two depth maps, the two context feature maps, and the interpolation frame kernels, wherein at least one of the following conditions applies:
the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;

the output frame is obtained using a pixel adaptive convolution frame synthesis method based on the two target optical flow maps, the two depth maps, the two context feature maps, and the interpolation frame kernel; and an interpolation frame for the two input frames is obtained based on the output frame, wherein the two input frames are image frames at two different time moments in a multi-frame video image.

According to an aspect of the present disclosure, there is provided a computer readable storage medium having a computer program stored thereon, wherein the computer program is configured, when executed by a processor, to implement the video frame interpolation method as described in any one of the foregoing.

According to an aspect of the present disclosure, there is provided an electronic device, comprising.

a processor; and a memory for storing one or more programs that, when the one or more programs are executed by one or more processors, cause one or more processors to implement the video frame interpolation method as described in any of the foregoing.

BRIEF DESCRIPTION OF THE DRAWINGS

The accompanying drawings herein are incorporated into and form part of the present specification, illustrate embodiments consistent with the present disclosure, and are used in conjunction with the present specification to explain the principles of the present disclosure. It will be apparent that the accompanying drawings in the following description are only some embodiments of the present disclosure, and that other drawings may be obtained from them without creative effort by one of ordinary skill in the art. In the accompanying drawings.

DETAILED DESCRIPTION OF THE EMBODIMENTS

The example embodiments will now be described more fully with reference to the accompanying drawings. However, the example embodiments can be implemented in a variety of forms and should not be construed as being limited to the examples set forth herein. Instead, the provision of these embodiments makes the present disclosure more comprehensive and complete, and communicates the idea of the example embodiments to those skilled in the art in a comprehensive manner. The features, structures, or characteristics described may be combined in any suitable manner in one or more embodiments.

In addition, the accompanying drawings are only schematic illustrations of the present disclosure and are not necessarily drawn to scale. Identical appended markings in the drawings indicate identical or similar parts, and thus repetitive descriptions of them will be omitted. Some of the block diagrams shown in the accompanying drawings are functional entities and do not necessarily correspond to physically or logically separate entities. These functional entities may be implemented in software form, or in one or more hardware modules or integrated circuits, or in different network and/or processor devices and/or microcontroller devices.

Figure 1:
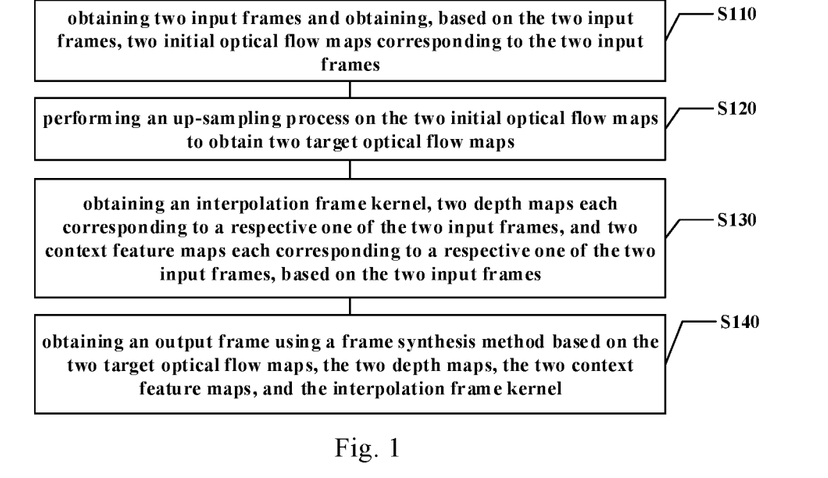
FIG. 1 schematically illustrates a flowchart of a video frame interpolation method in an exemplary embodiment of the present disclosure.

In an exemplary embodiment, a video frame interpolation method is first provided, and with reference to that shown in FIG. 1, the above video frame interpolation method may include the following steps.

S110, obtaining two input frames and obtaining, based on the two input frames, two initial optical flow maps corresponding to the two input frames.

S120, performing an up-sampling process on the two initial optical flow maps to obtain two target optical flow maps.

S130, obtaining an interpolation frame kernel, two depth maps corresponding to the two input frames respectively, and two context feature maps corresponding to the two input frames respectively based on the two input frames.

S140, obtaining an output frame using a frame synthesis method based on the two target optical flow maps, the two depth maps, the two context feature maps, and the interpolation frame kernel.

At least one of the following conditions applies:

an iterative residual optical flow estimation process is performed on the two input frames to obtain the two initial optical flow maps corresponding to the two input frames respectively;

a pixel adaptive convolutional joint up-sampling process is performed on the two initial optical flow maps based on the two input frames so as to obtain the two target optical flow maps;

the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;

the output frame is obtained using a pixel adaptive convolutional frame synthesis method based on the two target optical flow maps, the two depth maps, the two context feature maps, and the interpolation frame kernel; and an interpolation frame for the two input frames is obtained based on the output frame, wherein the two input frames are image frames at two different time moments in a multi-frame video image.

It is important to note that the interpolation frame herein refers to an image frame that can be interpolated between two input frames, which reduces video motion blur and improves video quality.

According to the video frame interpolation method provided in an exemplary embodiment of the present disclosure, as compared with the prior art, on the one hand, the initial optical flow maps are obtained by performing a motion estimation process on two adjacent input frames through iterative residual refined optical flow prediction, so as to initially improve the accuracy of the interpolation result; and on the other hand, the target optical flow maps are obtained by performing a pixel adaptive convolutional joint up-sampling process on the initial optical flow maps based on the input frames, so as to further improve the accuracy of the interpolation result. Besides, a depth estimation method with geometrical constraints from virtual surface normals is used for depth prediction, which depth prediction is further taken into consideration for projection of the target optical flow maps. In the synthesis module, the pixel adaptive convolution is used to enhance the interpolation results, which can well improve the quality of the interpolation results, leading to the obtained interpolation results of high accuracy. This renders it applicable to video enhancement and upgraded slow motion effects of video post-processing, leading to a variety of application scenarios of the video frame interpolation method.

In the following, the various steps of the video frame interpolation method in an exemplary embodiment of the present disclosure will be described in more detail in conjunction with the accompanying drawings and examples.

In step S110, two input frames are obtained, and two initial optical flow maps corresponding to the two input frames are obtained based on the two input frames.

In an example embodiment of the present disclosure, the two input frames obtained can be a first input frame and a second input frame. Then, a first initial optical flow map and a second initial optical flow map are obtained by performing an optical flow estimation process on the first input frame and the second input frame, where the first initial optical flow map can correspond to the first input frame and the second initial optical flow map can correspond to the second input frame.

In an example implementation, the optical flow estimation process for the above two input frames can be performed by using a new model obtained by training with PWC-Net (CNNs for Optical Flow Using Pyramid, Warping, and Cost Volume). The optical flow estimation process can also be performed by other models for the above two input frames, without any specific limitation in the present example implementation.

In an example embodiment of the present disclosure, the first initial optical flow map and the second initial optical flow map can be obtained by performing an optical flow estimation process only once on the first input frame and the second input frame as described above.

Figure 2:
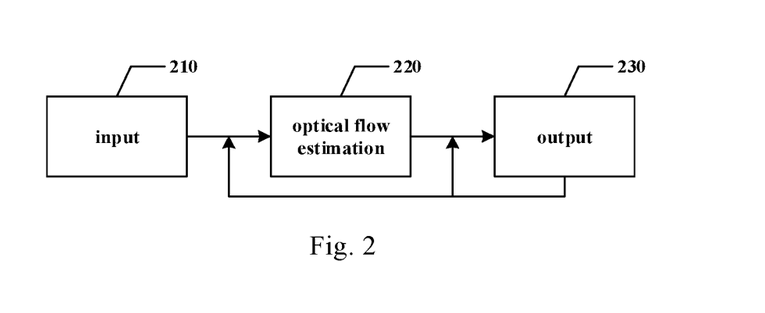
FIG. 2 schematically illustrates a block diagram of an optical flow estimation process in an exemplary embodiment of the present disclosure.

In another example implementation of the present disclosure, with reference to FIG. 2, the initial optical flow maps can be obtained by performing a motion estimation process on the two adjacent input frames using iterative residual refined optical flow prediction. Specifically, the optical flow estimation 220 can be performed for multiple times with the above described first input frame and second input frame as input 210. In the multiple times of optical flow estimation, the final output 220 of the Nth optical flow estimation 220 is used to update the input 210 as well as the output of the (N+1)th optical flow estimation, wherein N may be 1 or a positive integer such as 2, 3, 4, etc. greater than or equal to 1. Without any specific limitation in the present example implementation, N cannot exceed the maximum number of optical flow estimation.

Specifically, updating of the input and the output of the (N+1)th optical flow estimation with the final output of the Nth optical flow estimation, comprises: the two final outputs of the Nth optical flow estimation and the two inputs of the first optical flow estimation can be summed up respectively so as to obtain the input of the (N+1)th optical flow estimation; the final output of the Nth optical flow estimation and the initial output of the (N+1)th optical flow estimation can be summed up so as to obtain the final output of the (N+1)th optical flow estimation, wherein the final output of the last optical flow estimation can be used as the initial optical flow map.

In an example implementation, taking the value of N being 1 for a detailed explanation, wherein the server can feed the output 230 of the first optical flow estimation to the input 210 of the second optical flow estimation. I.e., the input of the second optical flow estimation can be obtained by summing up the two outputs of the first optical flow estimation with the first input frame and the second input respectively. I.e., the pixel values of the two outputs of the first optical flow estimation are summed up with the pixel values of the first input frame and the second input frame respectively, so as to obtain the input of the second optical flow estimation. After the second optical flow estimation, the first output of the first optical flow estimation is used to update the second initial output of the second optical flow estimation. The second target output is obtained by summing up the pixel values of the first output and the second initial output so as to obtain the second target output, where the second initial output is obtained after optical flow estimation for the input of the second optical flow estimation.

In step S120, two target optical flow maps are obtained by performing an up-sampling process on the two initial optical flow maps.

In a first example implementation of the present disclosure, the server can directly perform feature extraction on each of the two initial optical flow maps, and perform an up-sampling process at least once to obtain the target optical flow map after the feature extraction.

The operation of the convolution layer in the up-sampling process in an example implementation is shown below:

$$v_i^{l+1} = \sum_{j \in \Omega(i)} W^l[p_i - p_j]v_j^l + b^l$$

wherein, i can represent the pixel i, $v^l$ can be represented as the feature map of the lth layer in the convolutional neural network, $\Omega(i)$ can be expressed as the convolutional window around the pixel i, $W^l$ can be used to represent the convolution kernel of the lth layer in the convolutional neural network, $p_i$ can be used to represent the pixel coordinate, and $b^l$ can be used to represent the bias term of the lth layer in the convolutional neural network.

Figure 3:
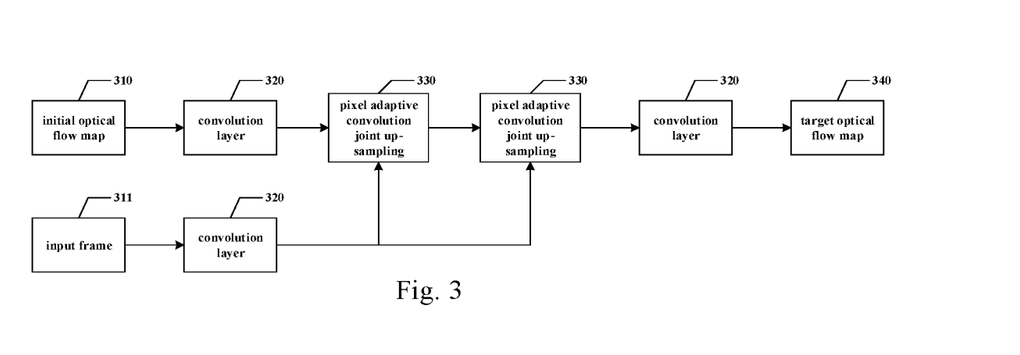
FIG. 3 schematically illustrates a block diagram of a pixel adaptive convolutional joint up-sampling module in an exemplary embodiment of the present disclosure.

In another example implementation of the present disclosure, referring to FIG. 3, a feature extraction process can be performed on the initial optical flow maps 310 by the convolution layer 320 to obtain the reference optical flow maps, and the same convolution layer 320 can be used to perform a feature extraction process on the input frame 311 to obtain the reference input maps. After that, the reference optical flow maps can be used as constraints for performing a pixel adaptive convolutional joint up-sampling process 330 on the reference input maps for multiple times so as to obtain the target optical flow maps 340.

Specifically, the server can perform feature extraction on the first initial optical flow map and the second initial optical flow map to obtain the first reference optical flow map and the second reference optical flow map respectively, and perform feature extraction on the first input frame and the second input frame to obtain the first reference input map and the second reference input map respectively. After that, the pixel adaptive convolutional joint up-sampling process can be performed at least once on the first reference optical flow map by using the first reference input map as a guide map, and then the feature extraction process is performed to obtain the first target optical flow map. Further, the pixel adaptive convolutional joint up-sampling process can be performed at least once on the second reference optical flow map by using the second reference input map as a guide map, and then the feature extraction process is performed to obtain the second target optical flow map.

In an example implementation, as shown in FIG. 3, the pixel adaptive convolutional joint up-sampling process 330 can be performed twice on the above reference optical flow map. In addition, the adaptive convolutional joint up-sampling process 330 can be performed on the above reference optical flow map for three, four, or more times, wherein the number of times for up-sampling can be determined based on the size relationship between the target optical flow map and the two input frames, and also based on the multiplicity of pixel adaptive up-sampling. No specific limitations are made in the present example implementation.

In an example implementation, during each time of the pixel adaptive convolutional joint up-sampling process 330 on the above reference optical flow map, it is required to use the above reference input map as a guide map. I.e., constraints are imposed on the above pixel adaptive convolutional up-sampling process. After the pixel adaptive convolutional joint up-sampling process 330 is performed multiple times on the above reference optical flow map, a feature extraction process can be performed on the output result by using the convolutional layer 320 to obtain the target optical flow map 340. This helps to improve the accuracy of the initial optical flow map 310 and to complete the optimization of the initial optical flow map 310.

Specifically, the pixel adaptive convolution is based on an ordinary convolution, multiplying the ordinary convolution by an adaptive kernel function K obtained by a guide feature map f I.e., the convolution operation in the pixel adaptive convolution up-sampling process is as follows:

$$v_i^{l+1} = \sum_{j \in \Omega(i)} K(f_i, f_j) W^l [p_i - p_j] v_j^l + b^l$$

wherein, i can represent the pixel i, $v^l$ can be represented as the feature map of the lth layer in the convolutional neural network, $\Omega(i)$ can be expressed as the convolutional window around the pixel i, $W^l$ can be used to represent the convolution kernel of the lth layer in the convolutional neural network, $p_i$ can be used to represent the pixel coordinate, and $b^l$ can be used to represent the bias term of the lth layer in the convolutional neural network. $f_i$ and $f_j$ can present the guide feature map. Specifically, the pixel j is a pixel point within a predetermined distance centered on pixel i, where the predetermined distance can be customized as needed and is not specifically limited in the present example implementation.

In an example implementation, the resolution of the initial optical flow map obtained after the above optical flow estimation is one-fourth of the input frame. Thus, in the present example implementation, the pixel adaptive convolutional joint up-sampling process can be performed twice with the sampling multiplicity being 2. Alternatively, the pixel adaptive convolutional joint up-sampling process can be performed once with the sampling multiplicity being 4. There is no specific limitation in the present example implementation. A reference optical flow map can be introduced as a guide map in the pixel adaptive joint up-sampling process, which in turn improves the up-sampling accuracy.

In step S130, an interpolation frame kernel, two depth maps corresponding to the two input frames respectively, and two context feature maps corresponding to the two input frames respectively are obtained based on the two input frames.

In an example implementation of the present disclosure, the depth maps can be obtained using the initial depth estimation module. The interpolation frame kernel as well as the first context feature map and the second context feature map are obtained based on the first input frame and the second input frame.

In an example implementation, a pre-trained model can be used to complete the spatio-temporal context feature extraction of the two input frames, and the feature map of any layer in the model can be used as the two context feature maps obtained. The above-mentioned training model can be a VGG model or a residual network, which is not specifically limited in the present example implementation.

In another example implementation of the present disclosure, the initial depth estimation model can be trained first to obtain the target depth estimation model. Then, the depth estimation model can be used to calculate the first depth map and the second depth map corresponding to the first input frame and the second input frame respectively.

In an example implementation, a pre-trained model of the monocular depth model MegaDepth may be used as the initial depth estimation model described above. Alternatively, other pre-trained models may be used as the initial depth estimation model, without any specific limitation in the present example implementation.

Specifically, the method for training the initial depth estimation model includes: firstly obtaining the real depth-of-field map of the two input frames, and a three-dimensional (3D) point cloud computation is performed on the real depth-of-field map. Specifically, the two-dimensional depth-of-field map is transformed into a three-dimensional map to obtain a relatively simple three-dimensional (3D) point cloud; then the reference virtual surface normal can be generated according to the 3D point cloud; and then referring to FIG. 4, the server can input the input frame 410 into the initial depth estimation model 420 to get the target depth-of-field map 430. After that, the 3D point cloud 440 is calculated for the above target depth-of-field map 430, and the target virtual surface normal 450 is generated according to the 3D point cloud 440. Then, the parameters in the initial depth estimation model are updated according to the error loss between the target virtual surface normal and the reference virtual surface normal to get the target depth estimation model. Specifically, the parameters in the initial depth estimation model are adjusted, so that the above error loss is minimized, and the initial depth estimation model with the minimized error loss is used as the target depth estimation model.

Figure 4:
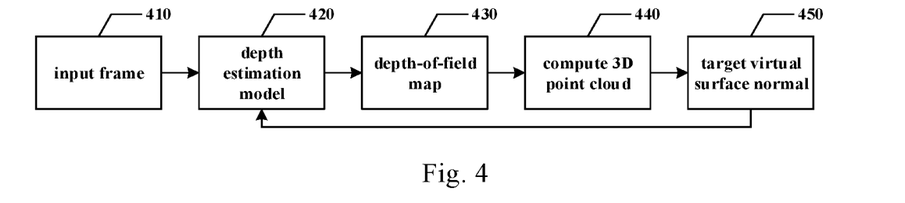
FIG. 4 schematically illustrates a block diagram for monocular depth estimation with constraints from the set of virtual surface normals in an exemplary embodiment of the present disclosure.

In an example implementation, the first input frame and the second input frame can be input into the target depth estimation model respectively, so as to obtain the first depth map and the second depth map.

In step S140, the projected optical flow map is determined based on the target optical flow maps and the depth maps, and the interpolation frame kernel, the deformed depth map, the deformed input frame, and the deformed context feature map are obtained.

Figure 5:
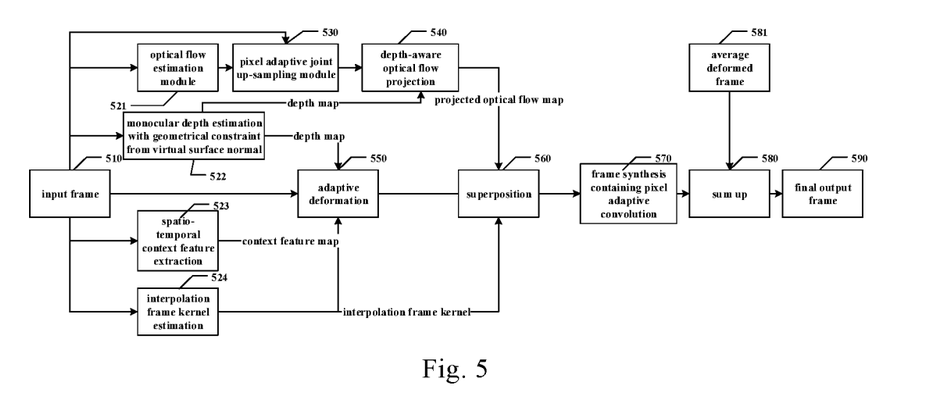
FIG. 5 schematically illustrates an overall block diagram of a video frame interpolation method in an exemplary embodiment of the present disclosure.

In an example embodiment of the present disclosure, referring to FIG. 5, the server can firstly allow the two input frames passing through the optical flow estimation module 521 and the pixel adaptive convolutional joint up-sampling module 530 so as to obtain the target optical flow map; then allow the input frames 510 passing through the monocular depth estimation 522 with constraint from the set of virtual surface normals so as to obtain the depth maps; and performing depth-aware optical flow projection 540 on the target optical flow map and the depth map to obtain the projected optical flow map.

Among them, the description related to the optical flow estimation 521 has been provided in detail above with reference to FIG. 2, and therefore will not be repeated herein; the description related to the pixel adaptive convolutional joint up-sampling module 530 has been provided in detail above with reference to FIG. 3; and the description related to the monocular depth estimation 522 with geometrical constraints from the virtual surface normal has been provided in detail above with reference to FIG. 4. Therefore, no repeated description is provided herein.

In an example implementation, the first projection optical flow map can be obtained by depth-aware optical flow projection of the first target optical flow map using the first depth map, and the second projection optical flow map can be obtained by depth-aware optical flow projection of the second target optical flow using the second depth map.

Specifically, the time of the first input frame mentioned above can be defined as the time moment 0, the time of the second input frame can be defined as the time moment 1, and a time moment t can be defined which lies between the first and second time moments. The projected optical flow map mentioned above can be calculated by the following equation:

$$F_{t\to 0}(x) = -t \frac{\sum_{y \in S(x)} \omega_0(y) \cdot F_{0\to 1}(x)}{\sum_{y \in S(x)} \omega_0(y)}$$

$$\omega_{0(y)} = \frac{1}{D_0(y)}$$

wherein, $F_{0\to 1}(y)$ denotes the optical flow of the pixel point y from the first input frame to the second input frame; $D_0(y)$ represents the depth value of the pixel point y; $y \in S(x)$ denotes the optical flow $F_{0\to 1}(y)$ of pixel point y, if the optical flow $F_{-}(0\to 1)$ (y) passes the pixel point x at the time moment t, then $F_{0\to 1}$ (x) can be approximated as $-t F (0\to 1)$ (y); $F_{0\to 1}$ (x) denotes the optical flow of the pixel point x from the time moment t to the first input frame.

In an example implementation, the server can obtain two context feature maps by spatio-temporal context feature extraction 523 of the above two input frames 510 respectively, perform interpolation frame kernel estimation 524 on the two input frames to obtain the interpolation frame kernel, and use the interpolation frame kernel to perform adaptive deformation 550 on the above two input frames, two depth maps, and two context feature maps, so as to get two deformed input frames, two deformed depth maps, and two deformed context feature maps.

In an example implementation, the depth estimation can be done using an hourglass model, the context feature extraction is done using a pre-trained ResNet neural network, while the kernel estimation and the adaptive deformation layer are based on the U-Net neural network, which are not specifically limited in the present example implementation.

In an example implementation, a deep learning classical backbone network can be used to generate the interpolation frame kernel at each pixel location based on the two input frames, and at the adaptive deformation layer, the two depth maps, the two input frames, and the two context feature maps are deformed to obtain two deformed input frames, two deformed depth maps, and two deformed context feature maps based on the interpolation frame kernel and the projected optical flow map.

In an example embodiment of the present disclosure, referring to FIG. 5, the server superimposes the interpolation frame kernel, the projected optical flow map, the deformed input frame, the deformed depth map, and the deformed context feature map 560 to obtain a synthesis image.

Figure 6:
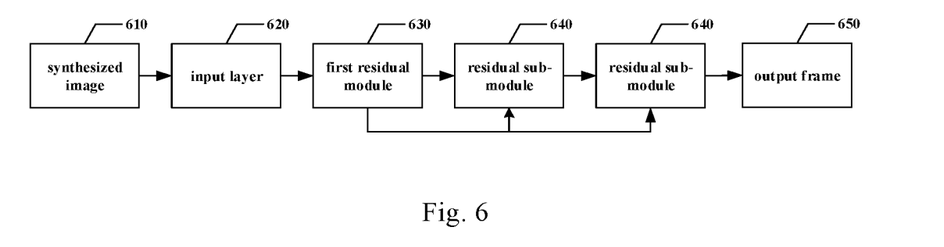
FIG. 6 schematically illustrates a block diagram of a frame synthesis module containing pixel adaptive convolution in an exemplary embodiment of the present disclosure.

In an example implementation, referring to FIG. 6, the server inputs the synthesis image 610 to the residual network through the input layer 620, and uses the output feature image of the first residual module 630 in the residual network as the feature guide map of the second residual module and the input of the second residual module. In order to input the feature guide map, the convolution layers in the residual modules other than the first residual module are replaced with pixel adaptive convolution layers, thereby forming the second residual module, wherein the second residual module may comprise at least one residual sub-module 640, the at least one residual sub-module 640 comprises a pixel adaptive convolution layer, and the residual sub-module may be a pixel adaptive convolution residual block.

Specifically, the convolution layer in the first residual module can be $$v_i^{l+1} = \sum_{j \in \Omega(i)} W^l [p_i - p_j] v_j^l + b^l$$

wherein, i can represent the pixel i, $v^l$ can be represented as the feature map of the lth layer in the convolutional neural network, $\Omega(i)$ can be expressed as the convolutional window around the pixel i, $W^l$ can be used to represent the convolution kernel of the lth layer in the convolutional neural network, $p_i$ and $p_j$ can be used to represent the pixel coordinates, and $b^l$ can be used to represent the bias term of the lth layer in the convolutional neural network.

The pixel adaptive convolution layer is used to replace the above convolution layer so as to obtain the second residual module, and the pixel adaptive convolution layer is $$v_i^{l+1} = \sum_{j \in \Omega(i)} K(f_i, f_j) W^l [p_i - p_j] v_j^l + b^l$$

wherein, i can represent the pixel i, $v^l$ can be represented as the feature map of the lth layer in the convolutional neural network, $\Omega(i)$ can be expressed as the convolutional window around the pixel i, $W^l$ can be used to represent the convolution kernel of the lth layer in the convolutional neural network, $p_i$ and $p_j$ can be used to represent the pixel coordinates, and $b^l$ can be used to represent the bias term of the lth layer in the convolutional neural network. $f_i$ and $f_j$ can be used to represent the guide feature maps Specifically, the pixel j is a pixel point within a predetermined distance centered on pixel i, wherein the predetermined distance can be customized as desired and is not specifically limited in the present example implementation.

The pixel adaptive convolution layer is based on the normal convolution layer multiplied by an adaptive kernel function K obtained from the guide feature map f.

In an example implementation, the feature image output by the first residual module 630 is used as a guide map for the second residual module. I.e., new constraints are added on the pixel adaptive convolution layer in the pixel adaptive residual block based on the feature image, so as to acquire output frames of higher accuracy.

In an example implementation, the number of residual blocks in the residual network may be multiple, such as 2, 3, 4, or more, which is not specifically limited in the present example implementation.

In an example implementation of the present disclosure, again referring to FIG. 5, the server can also obtain the average deformed frame 581 of the two deformed input frames and update the output frame 590 (i.e., the final output frame, which is also an interpolation frame) with the average deformed frame 581. Firstly, the average deformed frame is calculated based on the input frames, and then the average deformed frame is synthesized with the above-mentioned frames containing pixel adaptive convolution to obtain the output frame 650, which output frame 650 is stitched to obtain the final output frame 590.

Specifically, the average deformed frame can be calculated by summing up the pixel values of the two deformed input frames and calculating the average value of them. The new output frame 590 is obtained by summing up the average deformed frame and the output frame 650, i.e., summing up the pixel values of the average deformed frame and the output frame 650 to obtain the new output frame 590.

Figure 7:
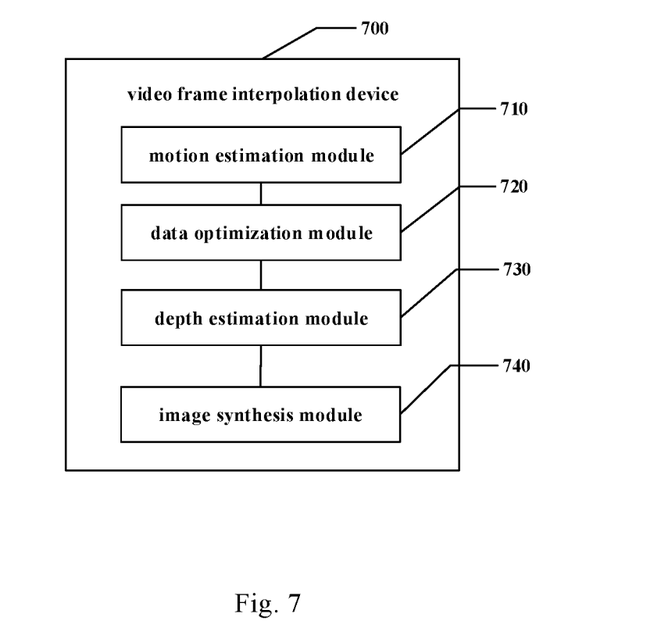
FIG. 7 schematically illustrates a schematic composition diagram of a video frame interpolation device in an exemplary embodiment of the present disclosure.

The following describes embodiments of devices of the present disclosure that can be used to perform the video frame interpolation method described above in the present disclosure. In addition, in an exemplary embodiment of the present disclosure, a video frame interpolation device is provided. Referring to FIG. 7, the video frame interpolation device 700 includes: a motion estimation processor 710, a data optimization processor 720, a depth estimation processor 730, and an image synthesis processor 740.

The motion estimation processor 710 can be used to obtain two input frames and obtain, based on the two input frames, two initial optical flow maps corresponding to the two input frames. The data optimization processor 720 can be used to perform an up-sampling process on the two initial optical flow maps to obtain two target optical flow maps. The depth estimation processor 730 can be used to obtain an interpolation frame kernel, two depth maps corresponding to the two input frames respectively, and two context feature maps corresponding to the two input frames respectively based on the two input frames. Further, the image synthesis processor 740 can be used to obtain an output frame using a frame synthesis method based on the two target optical flow maps, the two depth maps, the two context feature maps, and the interpolation frame kernel.

Since each functional processor of the video frame interpolation device in an example embodiment of the present disclosure corresponds to steps in an example embodiment of the video frame interpolation method described above, for details not disclosed in an embodiment of the device of the present disclosure, please refer to the embodiment of the video interpolation method described above of the present disclosure.

It should be noted that although a number of modules or units of the device for action execution are mentioned in the detailed description above, this division is not mandatory. In fact, according to embodiments of the present disclosure, features and functions of two or more modules or units described above may be specified in a single module or unit. Conversely, features and functions of one module or unit described above may be further divided to be specified by a plurality of modules or units.

In addition, in an exemplary embodiment of the present disclosure, there is provided an electronic device capable of implementing the above video frame interpolation method.

Those skilled in the art can appreciate that aspects of the present disclosure can be implemented as systems, methods, or program products. Accordingly, aspects of the present disclosure may be specifically implemented in the form of a fully hardware embodiment, a fully software embodiment (including firmware, microcode, etc.), or a combination of hardware and software aspects, which may be collectively referred to herein as a "circuit," "module" or "system".

The electronic device 800 according to embodiments of the present disclosure is described below with reference to FIG. 8. The electronic device 800 shown in FIG. 8 is merely an example and should not impose any limitations on the functionality or scope of use of embodiments of the present disclosure.

Figure 8:
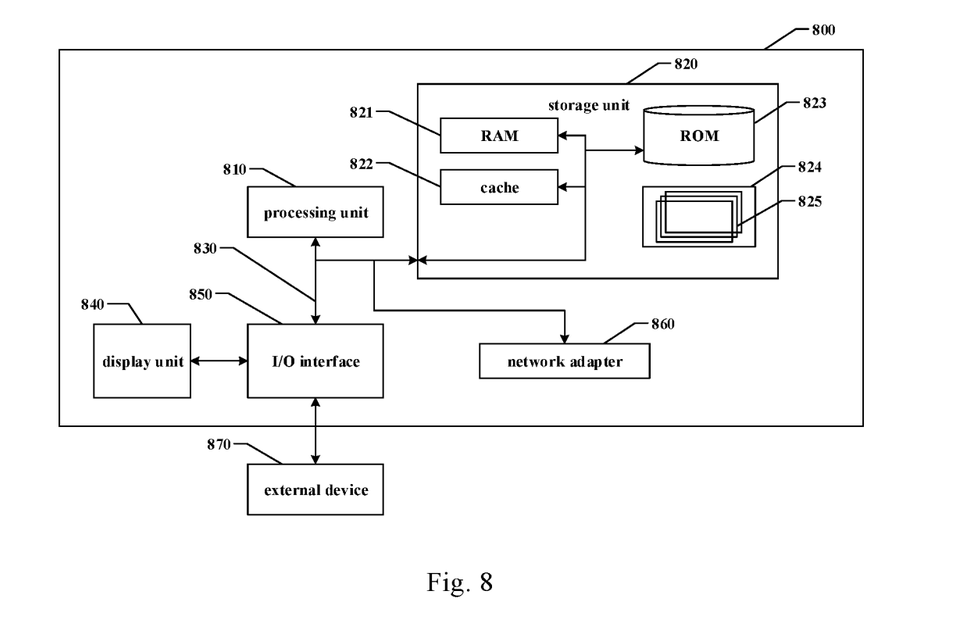
FIG. 8 schematically illustrates a schematic structural diagram of a computer system suitable for implementing the electronic device of an exemplary embodiment of the present disclosure.

As shown in FIG. 8, the electronic device 800 is represented in the form of a general purpose computing device. Components of the electronic device 800 may include, but are not limited to, at least one processing unit 810 described above, at least one storage unit 820 described above, a bus 830 connecting different system components (including the storage unit 820 and the processing unit 810), and a display unit 840.

The memory unit stores program code, which program code may be executed by the processing unit 810 such that the processing unit 810 performs steps according to various exemplary embodiments of the present disclosure described in the "Exemplary Methods" section above of the present specification. For example, the processing unit 810 may perform the steps shown in FIG. 1, S110: obtaining two input frames and obtaining, based on the two input frames, two initial optical flow maps corresponding to the two input frames; S120: optimizing the initial optical flow maps to obtain target optical flow maps; S130: obtaining an interpolation frame kernel, two depth maps corresponding to the two input frames respectively and two context feature maps corresponding to the two input frames respectively based on the two input frames; and S140: obtaining an output frame using a frame synthesis method based on the target optical flow maps, the two depth maps, the two context feature maps and the interpolation frame kernel.

As another example, the described electronic device can implement the various steps as shown in FIG. 1.

The memory unit 820 may include readable media in the form of volatile memory units, such as random access memory units (RAM) 821 and/or cache memory units 822. Further, the memory unit 820 may include read-only memory units (ROM) 823.

Storage unit 820 may also include a program/utility 824 having a set of (at least one) program modules 825, such program modules 825 including, but not limited to: an operating system, one or more applications, other program modules, and program data, wherein each of these examples or some combination may include an implementation of a network environment.

Bus 830 may be one or more of several types of bus structures, including a memory cell bus or a memory cell controller, a peripheral bus, a graphics acceleration port, a processing unit, or a local bus that using any bus structure among a plurality of bus structures.

The electronic device 800 may also communicate with one or more external devices 870 (e.g., keyboards, pointing devices, Bluetooth devices, etc.), with one or more devices that enable the user to interact with the electronic device 800, and/or with any device that enables the electronic device 800 to communicate with one or more other computing devices (e.g., routers, modems, etc.). This communication may be via input/output (I/O) interface 850. And, the electronic device 800 may also communicate with one or more networks (e.g., local area network (LAN), wide area network (WAN), and/or public networks, such as the Internet) through a network adapter 860. As shown, the network adapter 860 communicates with other modules of the electronic device 800 via the bus 830. It should be appreciated that although not shown in the figures, other hardware and/or software modules may be used in conjunction with the electronic device 800, including but not limited to: microcode, device drives, redundant processing units, external disk drive arrays, RAID systems, tape drives, and data backup storage systems, among others.

With the above description of embodiments, it is readily understood by those skilled in the art that the example embodiments described herein can be implemented by means of software or by means of software in combination with some necessary hardware. Thus, a technical solution according to an embodiment of the present disclosure may be embodied in the form of a software product that may be stored in a non-volatile storage medium (which may be a CD-ROM, USB flash drive, removable hard drive, etc.) or on a network, comprising a number of instructions to cause a computing device (which may be a personal computer, server, terminal device, or network device, etc.) to perform a method according to an embodiment of the present disclosure.

In an exemplary embodiment of the present disclosure, there is also provided a computer readable storage medium having stored thereon a program product capable of implementing the method described above in the present specification. In some possible embodiments, aspects of the present disclosure may also be implemented in the form of a program product comprising program code that, when the program product is run on a terminal device, is used to cause the terminal device to perform the steps described in the "Exemplary Methods" section above of the present specification according to various exemplary embodiments of the present disclosure.

Figure 9:
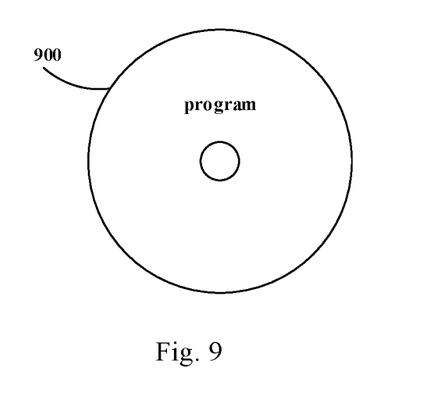
FIG. 9 schematically illustrates a diagram of a computer-readable storage medium according to some embodiments of the present disclosure.

Referring to FIG. 9, a program product 900 for implementing the above method according to embodiments of the present disclosure is depicted, which may employ a portable compact disk read-only memory (CD-ROM), include program code, and run on a terminal device, such as a personal computer. However, the program product of the present disclosure is not limited thereto, and for the purposes of the present document, a readable storage medium may be any tangible medium containing or storing a program that may be used by or in combination with an instruction execution system, device, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, device, or device, or any combination of the above. More specific examples of readable storage media (a non-exhaustive list) include: electrical connections with one or more wires, portable disks, hard disks, random access memory (RAM), read-only memory (ROM), erasable programmable read-only memory (EPROM or flash memory), optical fiber, portable compact disk read-only memory (CD-ROM), optical storage devices, magnetic memory devices, or any suitable combination of the above.

The computer readable signal medium may include a data signal propagated in a baseband or as part of a carrier wave that carries readable program code. This propagated data signal can take a variety of forms, including but not limited to electromagnetic signals, optical signals or any suitable combination of the above. The readable signal medium may also be any readable medium other than a readable storage medium that sends, propagates, or transmits a program for use by or in conjunction with an instruction execution system, device, or device.

The program code contained on the readable media may be transmitted by any suitable medium, including but not limited to wireless, wired, fiber optic, RF, etc., or any suitable combination of the above.

Program code for performing operations of the present disclosure may be written in any combination of one or more programming languages, the programming languages including object-oriented programming languages—such as Java, C++, etc., and also including conventional procedural programming languages—such as "C" language or similar programming languages. The program code may be executed entirely on a user computing device, partially on a user device, as a stand-alone package, partially on a user computing device and partially on a remote computing device, or entirely on a remote computing device or server. In the case involving a remote computing device, the remote computing device may be connected to the user computing device via any kind of network, including a local area network (LAN) or a wide area network (WAN), or, alternatively, may be connected to an external computing device (e.g., using an Internet service provider to connect via the Internet).

Further, the above appended drawings are merely schematic illustrations of the processing included in the method according to exemplary embodiments of the present disclosure, and are not intended to be limiting. It is readily understood that the processing shown above in the accompanying drawings does not indicate or limit the temporal order of such processing. It is also readily understood that these processes may be performed, for example, in multiple modules, either synchronously or asynchronously.

Other embodiments of the present disclosure will readily come to the mind of one skilled in the art upon consideration of the present specification and practice of the present invention disclosed herein. The present disclosure is intended to cover any variation, use, or adaptation of the present disclosure that follows the general principle of the present disclosure, and includes commonly known or customary technical means in the art that are not disclosed herein. The present specification and embodiments are to be considered exemplary only, and the true scope and spirit of the present disclosure is indicated by the claims.

It is to be understood that the present disclosure is not limited to the precise construction already described above and illustrated in the accompanying drawings, and that various modifications and changes can be made without departing from its scope. The scope of the present disclosure is limited only by the appended claims.

The invention claimed is:

1. A video frame interpolation method, comprising:
    obtaining two input frames and obtaining, based on the two input frames, two initial optical flow maps corresponding to the two input frames;
    performing an up-sampling process on the two initial optical flow maps to obtain two target optical flow maps;
    obtaining an interpolation frame kernel, two depth maps each corresponding to a respective one of the two input frames, and two context feature maps each corresponding to a respective one of the two input frames, based on the two input frames; and
    obtaining an output frame using a frame synthesis method based on the two target optical flow maps, the two depth maps, the two context feature maps, and the interpolation frame kernel, wherein at least one of the following conditions applies:
    an iterative residual optical flow estimation process is performed on the two input frames to obtain the two initial optical flow maps;
    the two initial optical flow maps are processed using a pixel adaptive convolution joint up-sampling process based on the two input frames to obtain the two target optical flow maps;
    the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;
    the output frame is obtained using a pixel adaptive convolution frame synthesis method based on the two target optical flow maps, the two depth maps, the two context feature maps, and the interpolation frame kernel; and
    an interpolation frame for the two input frames is obtained based on the output frame,
    wherein the two input frames are image frames at two different time moments in a multi-frame video image.

2. The video frame interpolation method according to claim 1, wherein the performing the iterative residual optical flow estimation process on the two input frames to obtain the two initial optical flow maps, comprises:
    performing the optical flow estimation process for a plurality of times on the two input frames, wherein while performing the optical flow estimation process for the plurality of times, input and output of the (N+1)th optical flow estimation process are updated using a final output of the Nth optical flow estimation process, N being a positive integer greater than or equal to 1; and
    using the final output of the last optical flow estimation process as the two initial optical flow maps.

3. The video frame interpolation method according to claim 2, wherein the updating of the input and the output of the (N+1)th optical flow estimation process using the output of the Nth optical flow estimation process, comprises:
    obtaining two inputs of the (N+1)th optical flow estimation process by summing up the two final outputs of the Nth optical flow estimation process and the two input frames of the first optical flow estimation process respectively; and
    obtaining the final output of the (N+1)th optical flow estimation process by summing up the two final outputs of the Nth optical flow estimation process and the two initial outputs of the (N+1)th optical flow estimation process respectively.

4. The video frame interpolation method according to claim 1, wherein the two input frames comprises a first input frame and a second input frame, the two initial optical flow maps comprises a first initial optical flow map and a second initial optical flow map, and the two target optical flow maps comprises a first target optical flow map and a second target optical flow map, wherein the first input frame corresponds to the first initial optical flow map and the second input frame corresponds to the second initial optical flow map;
    wherein the processing the two initial optical flow maps using the pixel adaptive convolution joint up-sampling process based on the two input frames to obtain the target optical flow maps, comprises:
    using the first input frame as a guide map for the pixel adaptive convolution joint up-sampling process, performing the pixel adaptive convolution joint up-sampling process on the first initial optical flow map to obtain the first target optical flow map; and
    using the second input frame as a guide map for the pixel adaptive convolution joint up-sampling process, performing the pixel adaptive convolution joint up-sampling process on the second initial optical flow map to obtain the second target optical flow map.

5. The video frame interpolation method according to claim 4, comprising:
    performing a feature extraction process on the first initial optical flow map and the second initial optical flow map respectively to obtain a first reference optical flow map and a second reference optical flow map, and performing a feature extraction process on the first input frame and the second input frame respectively to obtain a first reference input map and a second reference input map;
    performing a joint up-sampling process at least once on the first reference optical flow map using the first reference input map as a guide map and performing a feature extraction process to obtain the first target optical flow map; and
    performing a joint up-sampling process at least once on the second reference optical flow map using the second reference input map as a guide map, and performing a feature extraction process to obtain the second target optical flow map.

6. The video frame interpolation method according to claim 1, wherein the training of the initial depth estimation model using the error loss between the reference virtual surface normal generated by the real depth-of-field map of the two input frames and the target virtual surface normal generated by the target depth-of-field map to obtain the target depth estimation model, comprises:
    obtaining the real depth-of-field map of the two input frames and calculating the reference virtual surface normal of the real depth-of-field map;

obtaining the target depth-of-field map using the initial depth estimation model based on the two input frames and calculating the target virtual surface normal of the target depth-of-field map; and updating parameters of the initial depth estimation model based on the error loss between the reference virtual surface normal and the target virtual surface normal to obtain the target depth estimation model.

7. The video frame interpolation method according to claim 1, wherein the obtaining the output frame using the pixel adaptive convolution frame synthesis method based on the target optical flow maps, the depth maps, the context feature maps, and the interpolation frame kernel, comprises:

determining two projected optical flow maps based on the two target optical flow maps and the two depth maps, and obtaining an interpolation frame kernel, two deformed depth maps, two deformed input frames, and two deformed context feature maps; and using the pixel adaptive convolution frame synthesis method to synthesize the two projected optical flow maps, the interpolation frame kernel, the two deformed depth maps, the two deformed input frames, and the two deformed context feature maps, so as to obtain the output frame.

8. The video frame interpolation method according to claim 7, wherein the using the pixel adaptive convolution frame synthesis method to synthesize the two projected optical flow maps, the interpolation frame kernel, the two deformed depth maps, the two deformed input frames, and the two deformed context feature maps so as to obtain the output frame, comprises:

stitching the two projected optical flow maps, the two deformed depth maps, the two deformed input frames, the interpolation frame kernel and the two deformed context feature maps to obtain a synthesized image; and performing a frame synthesis process containing a pixel adaptive convolution on the synthesized image to obtain the output frame.

9. The video frame interpolation method according to claim 8, wherein the performing the frame synthesis process containing the pixel adaptive convolution on the synthesized input image to obtain the output frame, comprises:

inputting the synthesized image into a first residual module; and using an output feature map of the first residual module as an input and an input guide map of a second residual module, so as to complete frame synthesis to obtain the output frame, wherein the second residual module comprises at least one residual sub-module, which at least one residual sub-module comprises a pixel adaptive convolution layer.

10. The video frame interpolation method according to claim 7, wherein the determining the projected optical flow maps based on the two target optical flow maps and the two depth maps, and the obtaining the interpolation frame kernel, the two deformed depth maps, the two deformed input frames, and the two deformed context feature maps, comprise:

performing a depth-aware optical flow projection process on the two target optical flow maps respectively according to the two depth maps so as to obtain the projected optical flow maps;

performing a spatio-temporal context feature extraction process on the two input frames so as to obtain the two context feature maps, and performing an interpolation frame kernel estimation process on the two input frames so as to obtain the interpolation frame kernel; and performing an adaptive deformation process on the two input frames, the two depth maps, and the two context feature maps based on the projected optical flow map and the interpolation frame kernel so as to obtain the two deformed depth maps, the two deformed input frames, and the two deformed context feature maps.

11. The video frame interpolation method according to claim 7, wherein the obtaining the interpolation frame for the two input frames based on the output frame, comprises:

obtaining an average deformed frame of the two deformed input frames and updating the output frame with the average deformed frame; and using the updated output frame as the interpolation frame.

12. The video frame interpolation method according to claim 11, wherein the updating the output frame with the average deformed frame, comprises: summing up the average deformed frame and the output frame to obtain the interpolation frame.

13. A video frame interpolation device, comprising:

a motion estimation processor for obtaining two input frames and obtaining, based on the two input frames, two initial optical flow maps corresponding to the two input frames;

a data optimization module processor for performing an up-sampling process on the two initial optical flow maps to obtain two target optical flow maps;

a depth estimation processor for obtaining an interpolation frame kernel, two depth maps each corresponding to a respective one of the two input frames, and two context feature maps each corresponding to a respective one of the two input frames, based on the two input frames; and an image synthesis module processor for obtaining an output frame using a frame synthesis method based on the two target optical flow maps, the two depth maps, the two context feature maps and the interpolation frame kernel, wherein at least one of the following conditions applies:

an iterative residual optical flow estimation process is performed on the two input frames to obtain the two initial optical flow maps;

the two initial optical flow maps are processed using a pixel adaptive convolution joint up-sampling process based on the two input frames to obtain the two target optical flow maps;

the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;

the output frame is obtained using a pixel adaptive convolution frame synthesis method based on the two target optical flow maps, the two depth maps, the two context feature maps, and the interpolation frame kernel; and an interpolation frame for the two input frames is obtained based on the output frame, wherein the two input frames are image frames at two different time moments in a multi-frame video image.

14. An electronic device, comprising:
at least one hardware processor; and
a memory having program instructions stored thereon that, when executed by the at least one hardware processor, direct the at least one hardware processor to implement a video frame interpolation method, comprising:
obtaining two input frames and obtaining, based on the two input frames, two initial optical flow maps corresponding to the two input frames;
performing an up-sampling process on the two initial optical flow maps to obtain two target optical flow maps;
obtaining an interpolation frame kernel, two depth maps each corresponding to a respective one of the two input frames, and two context feature maps each corresponding to a respective one of the two input frames, based on the two input frames; and
obtaining an output frame using a frame synthesis method based on the two target optical flow maps, the two depth maps, the two context feature maps, and the interpolation frame kernel, wherein at least one of the following conditions applies:
an iterative residual optical flow estimation process is performed on the two input frames to obtain the two initial optical flow maps;
the two initial optical flow maps are processed using a pixel adaptive convolution joint up-sampling process based on the two input frames to obtain the two target optical flow maps;
the two depth maps are obtained using a target depth estimation model based on the two input frames, wherein the target depth estimation model is obtained by training an initial depth estimation model using an error loss between a reference virtual surface normal generated by a real depth-of-field map of the two input frames and a target virtual surface normal generated by a target depth-of-field map;
the output frame is obtained using a pixel adaptive convolution frame synthesis method based on the two target optical flow maps, the two depth maps, the two context feature maps, and the interpolation frame kernel; and
an interpolation frame for the two input frames is obtained based on the output frame,
wherein the two input frames are image frames at two different time moments in a multi-frame video image.

15. The electronic device according to claim 14, wherein the performing the iterative residual optical flow estimation process on the two input frames to obtain the two initial optical flow maps, comprises:
performing the optical flow estimation process for a plurality of times on the two input frames, wherein while performing the optical flow estimation process for the plurality of times, input and output of the (N+1)th optical flow estimation process are updated using a final output of the Nth optical flow estimation process, N being a positive integer greater than or equal to 1; and
using the final output of the last optical flow estimation process as the two initial optical flow maps.

16. The electronic device according to claim 15, wherein the updating of the input and the output of the (N+1)th optical flow estimation process using the output of the Nth optical flow estimation process, comprises:

obtaining two inputs of the (N+1)th optical flow estimation process by summing up the two final outputs of the Nth optical flow estimation process and the two input frames of the first optical flow estimation process respectively; and
obtaining the final output of the (N+1)th optical flow estimation process by summing up the two final outputs of the Nth optical flow estimation process and the two initial outputs of the (N+1)th optical flow estimation process respectively.

17. The electronic device according to claim 14, wherein the two input frames comprises a first input frame and a second input frame, the two initial optical flow maps comprises a first initial optical flow map and a second initial optical flow map, and the two target optical flow maps comprises a first target optical flow map and a second target optical flow map, wherein the first input frame corresponds to the first initial optical flow map and the second input frame corresponds to the second initial optical flow map;
wherein the processing the two initial optical flow maps using the pixel adaptive convolution joint up-sampling process based on the two input frames to obtain the target optical flow maps, comprises:
using the first input frame as a guide map for the pixel adaptive convolution joint up-sampling process, performing the pixel adaptive convolution joint up-sampling process on the first initial optical flow map to obtain the first target optical flow map; and
using the second input frame as a guide map for the pixel adaptive convolution joint up-sampling process, performing the pixel adaptive convolution joint up-sampling process on the second initial optical flow map to obtain the second target optical flow map.

18. The electronic device according to claim 17, wherein the video frame interpolation method further comprises:
performing a feature extraction process on the first initial optical flow map and the second initial optical flow map respectively to obtain a first reference optical flow map and a second reference optical flow map, and performing a feature extraction process on the first input frame and the second input frame respectively to obtain a first reference input map and a second reference input map;
performing a joint up-sampling process at least once on the first reference optical flow map using the first reference input map as a guide map and performing a feature extraction process to obtain the first target optical flow map; and
performing a joint up-sampling process at least once on the second reference optical flow map using the second reference input map as a guide map, and performing a feature extraction process to obtain the second target optical flow map.

19. The electronic device according to claim 14, wherein the training of the initial depth estimation model using the error loss between the reference virtual surface normal generated by the real depth-of-field map of the two input frames and the target virtual surface normal generated by the target depth-of-field map to obtain the target depth estimation model, comprises:
obtaining the real depth-of-field map of the two input frames and calculating the reference virtual surface normal of the real depth-of-field map;
obtaining the target depth-of-field map using the initial depth estimation model based on the two input frames and calculating the target virtual surface normal of the target depth-of-field map; and updating parameters of the initial depth estimation model based on the error loss between the reference virtual surface normal and the target virtual surface normal to obtain the target depth estimation model.

20. The electronic device according to claim 14, wherein the obtaining the output frame using the pixel adaptive convolution frame synthesis method based on the target optical flow maps, the depth maps, the context feature maps, and the interpolation frame kernel, comprises:

determining two projected optical flow maps based on the two target optical flow maps and the two depth maps, and obtaining an interpolation frame kernel, two deformed depth maps, two deformed input frames, and two deformed context feature maps; and using the pixel adaptive convolution frame synthesis method to synthesize the two projected optical flow maps, the interpolation frame kernel, the two deformed depth maps, the two deformed input frames, and the two deformed context feature maps, so as to obtain the output frame.

* * * * *